(12) United States Patent
Lattmann et al.

(10) Patent No.: US 7,444,562 B2
(45) Date of Patent: Oct. 28, 2008

(54) TRIE-TYPE MEMORY DEVICE WITH A COMPRESSION MECHANISM

(75) Inventors: Joel Lattmann, Champs sur Marne (FR); Christian Duret, Chatillon (FR); Valéry Laspreses, Issy les Moulineaux (FR); Francis Rischette, Paris (FR)

(73) Assignee: France Telecom, Paris (FR)

( * ) Notice: Subject to any disclaimer, the term of this patent is extended or adjusted under 35 U.S.C. 154(b) by 369 days.

(21) Appl. No.: 11/380,550

(22) Filed: Apr. 27, 2006

(65) Prior Publication Data

US 2007/0011577 A1  Jan. 11, 2007

(30) Foreign Application Priority Data

Oct. 28, 2003  (WO) .................. PCT/FR03/03215

(51) Int. Cl.
*G11C 29/00*  (2006.01)
*G06F 17/30*  (2006.01)

(52) U.S. Cl. ...................... 714/718; 714/763

(58) Field of Classification Search ................ 714/718, 714/763

See application file for complete search history.

(56) References Cited

U.S. PATENT DOCUMENTS

| | | | |
|---|---|---|---|
| 5,781,772 A | | 7/1998 | Wilkinson et al. |
| 5,909,440 A | * | 6/1999 | Ferguson et al. ........... 370/389 |
| 6,014,659 A | | 1/2000 | Wilkinson et al. |
| 6,425,099 B1 | | 7/2002 | Lattmann et al. |
| 6,505,206 B1 | | 1/2003 | Tikkanen et al. |
| 6,691,171 B1 | * | 2/2004 | Liao ........................... 709/245 |
| 6,704,313 B1 | | 3/2004 | Duret et al. |

FOREIGN PATENT DOCUMENTS

| | | |
|---|---|---|
| EP | 0 989 502 | 3/2000 |
| EP | 0 458 698 | 8/2000 |
| EP | 1 030 493 | 8/2000 |
| WO | WO 00/75804 | 12/2000 |

OTHER PUBLICATIONS

Masui, T., "Keyword Dictionary Compression Using Efficient Trie Implementation", IEEE Comput. Soc., (1991), p. 438.

(Continued)

*Primary Examiner*—James C Kerveros
(74) *Attorney, Agent, or Firm*—Drinker Biddle & Reath LLP (57) ABSTRACT

The invention relates to a tri-type memory device comprising a compression mechanism. According to the invention, the memory stores binary patterns that are associated with respective references. Data chains are analyzed by successive section of K bits (K>1) in order to extract one of the references when there is a match with a stored binary pattern associated with said reference. The memory is organized into several successive memory cell states, the analysis of the (i+1)-th section of a chain providing access to a cell of stage i≧0. Each non-empty cell of a stage i≧0 contains one of the following: a register-type analysis tracking pointer designating a register of $2^K$ cells of stage i+1; a linear-type analysis tracking pointer designating a zone of one or two cells forming a reduced register of stage i+1; or a reference associated with a stored binary pattern.

7 Claims, 6 Drawing Sheets

OTHER PUBLICATIONS

Pei, Tong-Bi, "Putting Routing Tables in Silicon", IEEE Network, vol. 6, No. 1, (1992), pp. 42-50.

Fredkin, E., "Trie Memory", Communications of The ACM, vol. 3, No. 9, (1960), pp. 490-499.

Aoe, Jun-Ichi, "An Efficient Implementation of Static String Pattern Matching Machines", IEEE Transactions On Software Engineering, vol. 15, No. 9 (1989), pp. 1010-1016.

Livonen, J.P., "An Experimental Study of Compression Methods For Functional Tries", Conference WAAPL (1999).

* cited by examiner

TRIE-TYPE MEMORY DEVICE WITH A COMPRESSION MECHANISM

RELATED APPLICATIONS

The subject application is a U.S. National Stage application that claims the priority of International Application No. PCT/FR2003/003215, filed on 28 Oct. 2003.

FIELD OF INVENTION

The present invention relates to associative memories and particularly "TRIE"-type (from "reTRIEve") memories.

BACKGROUND OF THE INVENTION

The principle of the "TRIE" memory was proposed by R. de la Briandais and E. Fredkin toward the end of the 1950s (see E. Fredkin et al.: "*Trie Memory*", Communications of the ACM, Vol. 3, No. 9, September 1960, pages 490-499). It involves dividing bit strings to be recognized into successive sections of fixed length (of K bits) and incorporating them into a two-dimensional table T. Each line of the table forms a register of $2^K$ individual cells. A register (R) is allocated to each section of the string and a cell in the register is associated with the value (V), lying between 0 and $2^K-1$ of that section. The content (C=T[R,V]) of the cell thus determined represents either the register allocated to the next section (or pointer), or an end-of-analysis reference (or "status") if the analysis of the string must terminate on that section.

The register allocated to the first section of the string, that is also the entry point of the table, is called a portal. The data to be analyzed in the form of bit strings, i.e. to be compared with the content of the TRIE memory, will also be called routes hereinafter. The succession of stringed cells associated with a route will be called a path in the table. Each register of the table will be of the order $i \geq 0$ if it is allocated to the (i+1)th section of one or more stored routes. The portal register is therefore of the order 0. The TRIE memory associates with each of its registers of the order $i \geq 0$ a unique sequence of iK bits corresponding to the first iK bits of each route whose path in the table passes through a cell of the register in question.

The following example shows a representation of the storage of the data in a TRIE memory in the particular case in which K=4. The value of each section is represented by a digit in hexadecimal numbering (0,1, . . . ,E,F), and the registers each contain $2^4=16$ cells.

Figure 1:
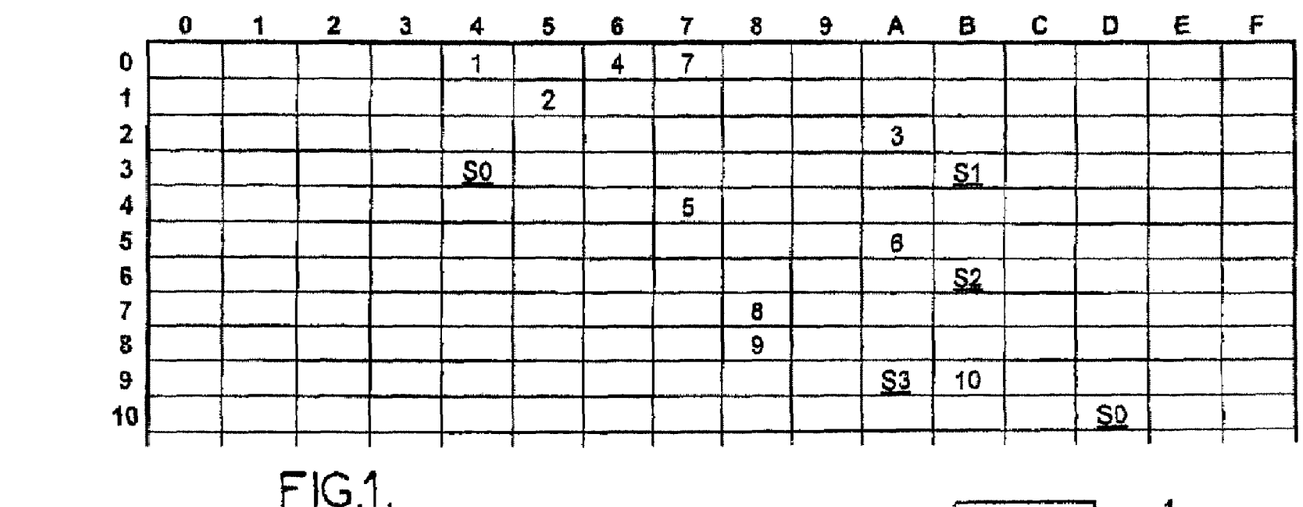
FIG. 1, previously explained, shows an example of content of a TRIE memory.

Assume that the routes that begin with the patterns 45A4, 45AB, 67AB, 788A and 788BD, to which the statuses S0, S1, S2, S3 and S0 are allocated respectively (one and the same status may be shared by several routes) are to be recognized. By setting out the register R by position in the line, the value V of the sections by position in the column, and by taking as the portal the register $R_0=0$, the TRIE memory table may be presented as shown in FIG. 1, where the underlined data are statuses. The patterns 45A4, 45AB, 67AB, 788A and 788BD are respectively represented in the table of FIG. 1 by the paths:

T[0, 4] → T[1, 5] → T[2, A] → T[3, 4];
T[0, 4] → T[1, 5] → T[2, A] → T[3, B];
T[0, 6] → T[4, 7] → T[5, A] → T[6, B];
T[0, 7] → T[7, 8] → T[8, 8] → T[9, A];
T[0, 7] → T[7, 8] → T[8, 8] → T[9, B] → T[10, D].

It can be seen in this example that all the patterns beginning with a common part of iK bits are represented by a common beginning of a path in the memory, leading to the register of order i with which the sequence formed by these iK bits is associated.

Figure 2:
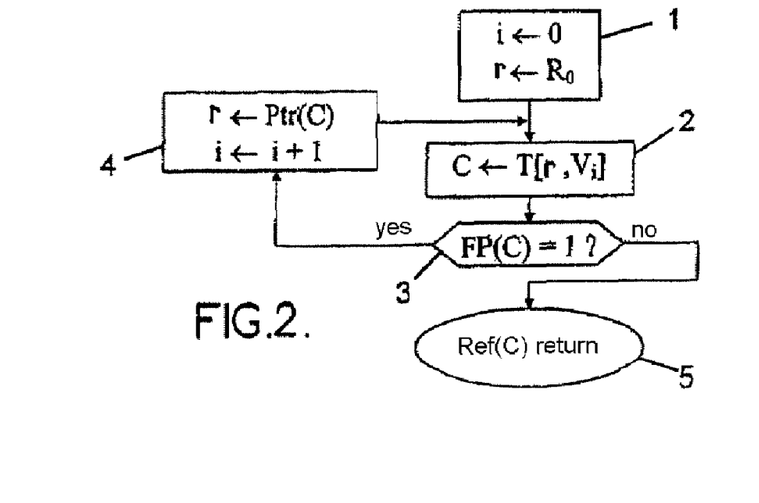
FIG. 2, previously explained, is a flowchart of a conventional analysis procedure executed to consult the TRIE memory.

If consideration is given to a route to be analyzed, divided into a series of binary sections of values $V_i$ where $0 \leq i \leq N$ and $\{R_i\}$ the sequence of registers associated with the values $V_i$, $R_0$ again designating the portal register, the analysis algorithm applied may be that shown in FIG. 2.

On the initialization 1 of this algorithm, the analysis rank i is set to 0 and the portal register $R_0$ is selected as the register r. In each iteration of rank i, the content C of the cell $T[r,V_i]$ designated by the (i+1)th section $V_i$ of the route in the selected register of the order i is read in step 2. If this cell contains an analysis continuation pointer, which, in the test 3, the value 1 of a bit FP(C) stored in the cell indicates, the register of order i+1 designated by this pointer Ptr(C) is selected as the register r for the next iteration in step 4, and the rank i is incremented. When the test 3 reveals a cell that does not contain a pointer (FP(C)=0), the status Ref(C) read in the cell concerned is returned in step 5 as the result of the consultation of the table.

This algorithm allows routes comprising any number of sections to be analyzed. One and the same table may be used for several types of analyses by managing the data from different portals. In addition, it makes it possible to control the data analysis time: the analysis of a number N of sections of K bits will last no more than N times the duration of an iteration.

The algorithm of FIG. 2 may be applied very rapidly by a hardware component managing the access points to the memory table. In particular, it allows the production of high performance routers for packet-switched telecommunications networks. The packet header is analyzed on the fly by the component, and the status associated with a route designates for example an output port of the router to which the packets carrying a destination address complying with this route must be forwarded.

Such a router may be a multi-protocol router. For this, different portions of the header are analyzed based on different portals. For example, a first analysis of one or more fields of the header designating the protocol used and/or the version of this protocol may be analyzed based on a first portal. This first analysis supplies a reference which, although corresponding to a logical end of analysis, may be materialized in the TRIE memory by an analysis continuation pointer designating another portal register to be used to analyze the rest of the header. The reference in question may also trigger timers or skips of a determined number of bits in the analyzed header in order to be able to choose which portion of the header must be analyzed next. In practice, a certain number of analyses are usually carried out successively, to trigger the operations required by the protocols supported according to the content of the headers. One of these analyses will relate to the destination address to accomplish the actual routing function.

The fact that it is possible to string together several individual analyses with programmable skips between them provides the process with great flexibility, particularly for processing protocols encapsulated according to several layers of the OSI model. Analysis on the fly of the sections of the header as and when they arrive furthermore provides great speed.

Another advantage of TRIE tables is that they allow routing requirements to be taken into account on the basis of the longest path recorded corresponding to a prefix of the route to be recognized, a requirement that is encountered in particular in the context of IP routing (see EP-A-0 989 502).

EP-A-1 030 493 discloses a TRIE memory whose content includes, in addition to the actual references associated with the packet headers, a program consisting in stringing together individual analyses to be carried out according to the various configurations taken into account by the memory. These strings are fully programmable. The user can arbitrarily, and at each step of the process, define which portion of the header must be examined and based on which register of the TRIE memory, thereby providing great processing flexibility.

A TRIE memory may also be described as a tree with nodes distributed at several successive stages corresponding to the previously mentioned orders of analysis i. Each node of a stage i represents a decision to be taken during the analysis of the (i+1)th section of a route. The root-node of the tree corresponds to the portal register, the leaf-nodes correspond to the statuses and the intermediate nodes correspond to the registers designated by the analysis continuation pointers. The tree representation makes it easy to view the paths. The tree of FIG. 3 thus shows the paths recorded in the table of FIG. 1, the root and the intermediate nodes being represented by circles (registers) and the leaves by rectangles (statuses).

The tree representation makes it possible to design compression methods aimed at reducing the memory size required to use a TRIE table. This reduction is particularly useful for rapid implementations of large-sized tables by means of static RAM (SRAM) circuits. A hardware realization in table form in which each register comprises $2^K$ cells is specifically not very effective in terms of memory occupancy since such a table comprises many empty cells, as shown in FIG. 1. When the tree is occupied by a large number of random data items, the nodes close to the root have a number of valid descendants close to the number of descendants possible ($2^K$). On the other hand, when further from the root, the average number of valid descendants of a given node diminishes considerably and tends toward 1 (or 2 if a default status is included). In this case, there is only 10% and 15% useful cells in the memory.

The article "*An Experimental Study of Compression Methods for Functional Tries*" by J-P. Livonen, et al., submitted to the WAAPL'99 conference (1999) reviews several known compression methods that can be combined:

path compression consists in aggregating, on a node Y of a stage i, the nonempty nodes of the stages i+1 to i+j-1 (j≧2) that are the descendants of this node Y when each of these nodes of the stages i to i+j-1 has a single nonempty descendant (register or status). See also U.S. Pat. Nos. 6,014,659 and 6,505,206. The length of the section to be analyzed in relation with the compressed node Y is multiplied by j;

level compression consists in aggregating, on a node Z of a stage i, the nonempty nodes of the stages i+1 to i+j-1 (j≧2) that are descendants of this node Z when each of these nodes of the stages i+1 to i+j-1 has itself at least one nonempty descendant (register or status). The length of the section to be analyzed in relation with the compressed node Z is multiplied by j;

width compression, or pointer compression, consists in eliminating the empty descendants of a given node. See also U.S. Pat. No. 5,781,772, EP-A-0 458 698 or WO 00/75804. There is no point in reserving a register of $2^K$ cells to analyze a section having only L<$2^K$ valid values in paths recorded in the TRIE memory: it is possible to be content with a compressed zone of L cells, associated with cartographic data indicating the valid values of the section. These cartographic data typically take the form of a bitmap vector of $2^K$ bits set at 1 in L positions corresponding to the L valid values of the section and at 0 in the other $2^K$-L positions.

In the path and level compression methods, modifying during the analysis the length of the divided sections in the data to be analyzed lends itself poorly to a fast implementation in a specific hardware component. Essentially it makes it possible to reduce the memory size required for a software implementation that is by nature less rapid.

The width compression method does not suffer from this limitation. However, it requires the actual analysis of a section to be preceded by the analysis of the associated bitmap to validate the value of the section and locate the corresponding cell. This method may be implemented in a rapid hardware model, but a limitation to this rapidity is that its complexity increases greatly with the width K of the section. Specifically, the function used to obtain the address of the successor of a given node requires resources (node size) of a complexity proportional to $2^K$.

Furthermore, a TRIE table lends itself to parallel processing in pipeline mode, as evoked in the article "*Putting Routing Tables in Silicon*", by T-B. Pei et al., IEEE Network Magazine, January 1992, pages 42-50. If the maximum number of stages of the tree is equal to M, that is to say if the data strings to be analyzed can go up to M×K bits, the available memory space can be divided into N memory planes, where N≦M. Each memory plane $P_j$ of level j (0≦j<N) is reserved for the nodes of one or more consecutive stages of the tree. N operators function in parallel each with a respective buffer containing a data string to be analyzed. While one of the N operators carries out an analysis at the order or consecutive orders of the level j, by accessing the memory plane $P_j$, another operator may access the memory plane $P_{j-1}$ to carry out the analysis of a subsequent data string at the order or the consecutive orders of the level j-1. This pipeline processing by the N operators increases the maximum processing speed of the device.

An object of the present invention is to propose an effective method of compressing a TRIE memory, which facilitates the high speed processing of data strings to be analyzed and can be implemented by a hardware component of limited complexity.

SUMMARY OF THE INVENTION

The invention therefore proposes a TRIE memory device comprising means for storing bit patterns associated with respective references, and means for analyzing data strings by successive sections of K bits to extract one of the references when an analyzed data string matches a stored bit pattern associated with said reference (K>1). The storage means comprise a plurality of successive stages each including a plurality of memory cells. Each nonempty memory cell of a stage i≧0 contains a cell type indicator and data including:

a pointer designating another memory cell when the cell type indicator is in a first or a second state, the pointer being accompanied by a test value on K bits when the cell type indicator is in the second state;

a reference associated with a stored bit pattern when the cell type indicator is in a third state.

The analysis means comprise:

means of reading a cell of a stage i≧0 in relation with the analysis of the (i+1)th section of a data string;

means of selecting a cell of stage i+1, to be read in relation with the analysis of a (i+2)th section of the data string, in response to the first state of the indicator in said cell of stage i, the selected cell being located relative to the designated cell by the pointer contained in said cell of stage i according to the value of the (i+1)th section of the data string;

means of selecting the cell designated by the pointer contained in said cell of stage i, to be read in relation with the analysis of a (i+2)th section of the data string, in response to the second state of the indicator in said cell of stage i when the value of the (i+1)th section of the data string coincides with the test value contained in said cell of stage i; and means of extracting the reference contained in said cell of stage i in response to the third state of the indicator in said cell of stage i.

The children of a node of the TRIE tree may in particular be located, preferably reversibly, either in a register comprising all the possible successors of a given node (register of $2^K$ cells), or in a zone forming a minimum register (of one or two cells) when the "path compression" conditions are fulfilled (the node has only one valid child node). A pointer then designates either the first cell of the register of $2^K$ cells, or the cell or the first cell of the zone forming the minimum register.

Thus the device uses a method midway between width compression and path compression.

The compression results from the fact that a node of the tree through which only one stored path passes does not need to point toward another register of $2^K$ cells. It only needs to point toward a reduced zone, of one or two cells, that occupies less memory space.

An advantage of this device is that it lends itself to a simple hardware implementation given that the size of the analyzed sections remains fixed and a section can be analyzed in a clock cycle.

However, it does not suffer, like the width compression method, from the exponential increase in the size of the nodes with the size of the analyzed sections. With a given component technology, it is then possible to increase the processing speed of the device by increasing the size of the sections without being penalized by too much complexity.

When the indicator, present in the cell of stage i read for the analysis of the (i+1)th section of a data string, is in the second state and the value of the (i+1)th section of the data string differs from the test value contained in that cell of stage i, the analysis means preferably return a default reference. This default reference may be common to the whole TRIE tree. It is however advantageous that it depends on the node to which said cell of stage i corresponds. The default reference may then be that which is associated with the longest path recorded corresponding to a prefix of the route to be recognized (the "longest match").

In an advantageous embodiment, the storage means are divided into N distinct memory zones from levels 0 to N−1, N being less than the maximum number of stages of the storage means, and the analysis means are organized as a pipeline in relation with the N memory zones.

DESCRIPTION OF PREFERRED EMBODIMENTS

To illustrate the following description, consideration is given to the case in which packets to be forwarded by a router are transported over an asynchronous transfer mode (ATM) network and it is assumed that the header of each packet is always contained in an ATM cell.

Figure 4:
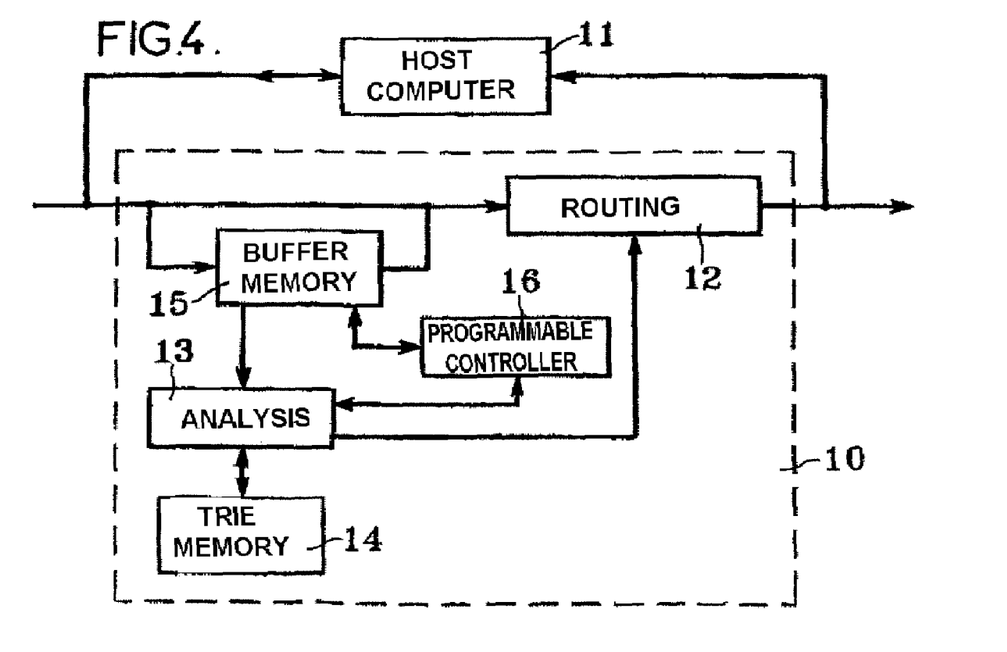
FIG. 4 is a block diagram of a packet router incorporating a device according to the invention.

The router 10 shown in FIG. 4 operates with a host computer 11. The host computer 11 may transmit and receive packets, particularly for the management of the routing process. For this, it has a virtual channel (VC) at the input and output of the router 10.

The router 10 comprises a forwarding module 12 which forwards the received packets according to instructions, hereinafter called "forwarding references" or "final status", obtained by an analysis module 13 from a memory 14 organized as a TRIE memory table. In the case of ATM network equipment, the forwarding module 12 may essentially translate the virtual path identifiers and virtual channel identifiers (VPI/VCI), merge the virtual channels according to the virtual paths, and deliver the packets to the output ports of the router. For this, it needs to know the VPI/VCI pairs of outgoing packets, which may constitute the forwarding references in the TRIE memory 14.

Each ATM cell containing the header of a packet to be routed passes through a buffer memory 15 to which the analysis unit 13 has access for analyzing portions of these headers by means of the TRIE memory 14. This analysis is for example carried out by nibbles (K=4) or by bytes (K=8).

Configuring the router 10 consists in recording the pertinent data in the TRIE memory 14. This operation is carried out by a unit (not shown) for managing the TRIE memory under the control of the host computer 11. The configuration commands may be received in packets transmitted over the network to the router 10. For a way of dynamically managing the content of the TRIE memory 14, reference may be made to EP-A-0 989 502.

In the exemplary router represented in FIG. 4, the analysis unit 13 interacts with a programmable controller 16 programmed to carry out certain checks and take certain actions on the packet headers, in a manner dependent on the communication protocols supported by the router. With the exception of this programmable controller 16, the operation of the router 10 is independent of the packet transport protocols.

Figure 5:
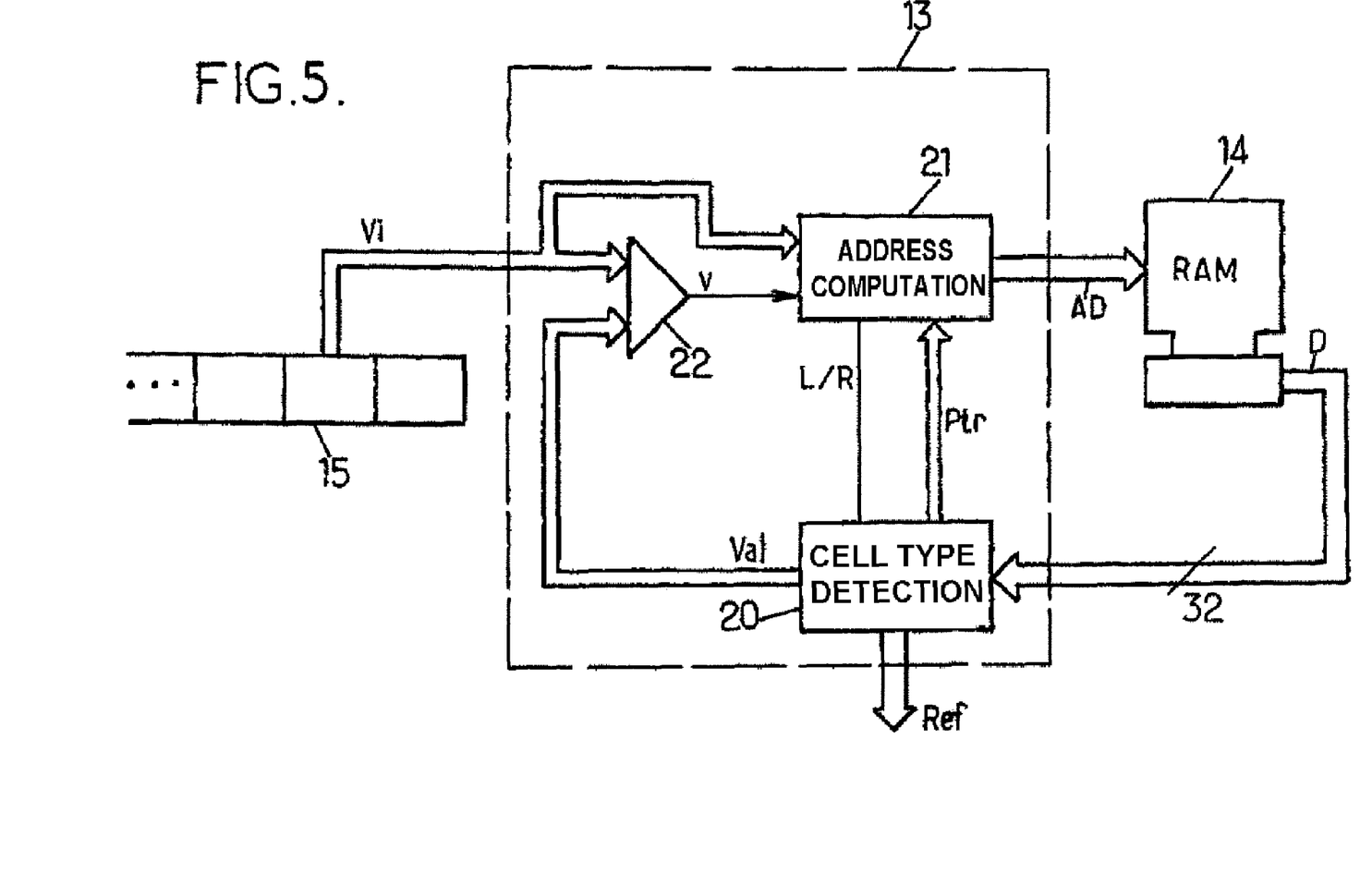
FIG. 5 is a diagram of a circuit forming a device according to the invention.

FIG. 5 shows a TRIE memory device according to the invention. In this example, each individual cell of the TRIE memory occupies 32 bits. FIG. 5 shows the analysis unit 13, the TRIE memory 14, and the buffer memory 15 intended to receive a data string to be analyzed by sections of K bits.

Figure 3:
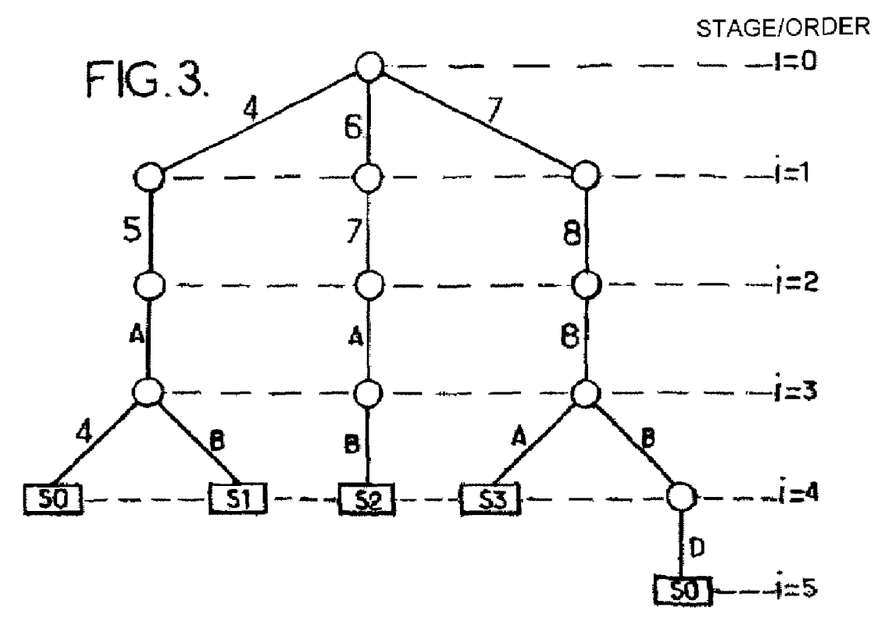
FIG. 3, previously explained, is a tree representation of the TRIE memory having the content illustrated in FIG. 1.

The TRIE memory comprises a memory plane 14, advantageously produced in SRAM (Static Random Access Memory) technology. This memory plane comprises a data bus D 32 bits wide, and an address bus AD whose width depends on the quantity of data to be stored in the TRIE memory. The memory plane 14 is organized in the form of a set of zones or registers each corresponding to a node of a tree as illustrated in FIG. 3. These registers are therefore logically divided into stages I=0, 1, 2, etc. Each register comprises one or more 32-bit memory cells that can be addressed by the AD bus.

Figure 6:
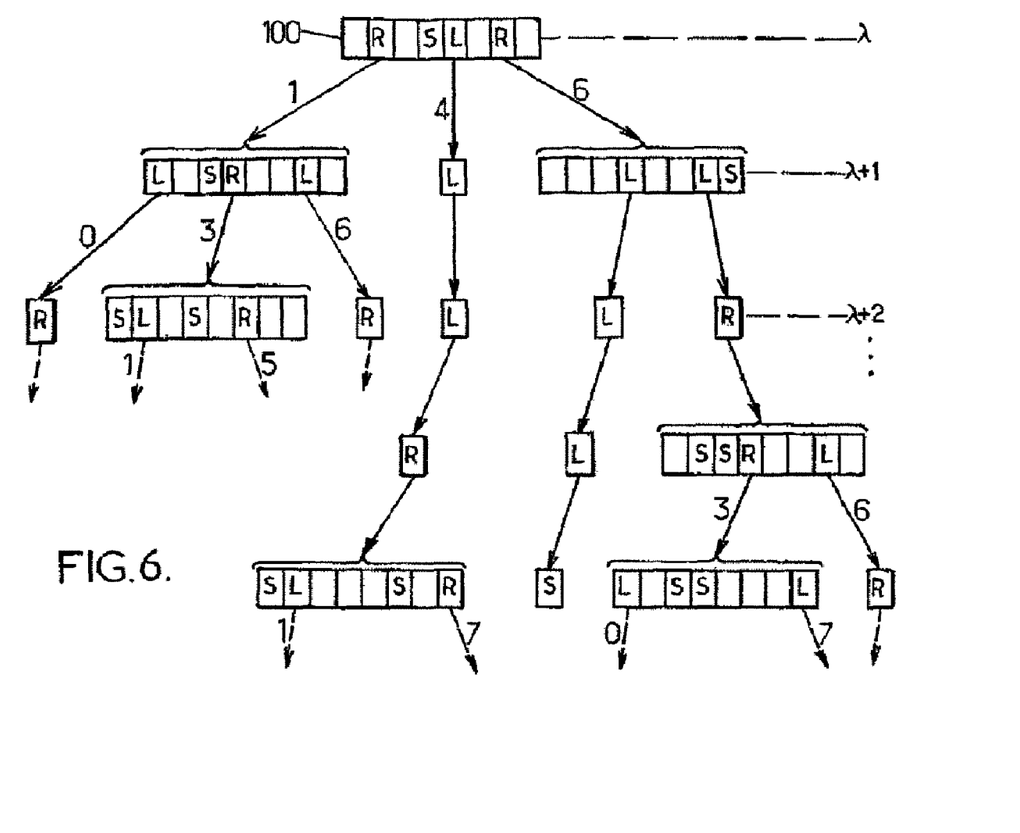
FIG. 6 is a tree representation of a TRIE memory organized according to the invention.

FIG. 6 shows a manner according to the invention of organizing the cells of a TRIE tree based on a root-node of a stage λ. If λ>0, it is a sub-tree deployed based on a register 100. If λ=0, the register 100 is the portal register of the memory. In the example shown, K=3 has been chosen to avoid overloading the drawing.

FIG. 6 shows that the cells of the TRIE memory may be either isolated or grouped together in registers of $2^K$ cells. Each node of the tree then corresponds to either an isolated cell or to a register of $2^K$ cells.

Three types of cell are considered here. The cells marked S in FIG. 6 are of the status type and contain a reference associated with one of the recorded paths. The cells marked R each contain a pointer in "register" mode which designates a register of $2^K$ cells of the next stage. The pointer in register mode therefore designates, explicitly or implicitly, the first cell of this register of the next stage. The cells marked L each contain a pointer in "linear" mode which designates an isolated cell of the next stage. The other cells, not marked in FIG. 6, do not contain useful information relating to the recorded paths. It can be seen that the use of the linear mode makes it possible to reduce the number of these empty cells, and therefore optimize the use of the available memory space.

In register mode, the use of the pointers is identical to that described in the introduction. The pointer indicates the register in which the analysis will be continued, and the value of the current section of K bits makes it possible to locate the cell of this register that will be read to continue the analysis.

In linear mode, there is no need to locate the cell in a register since it is an isolated cell that is designated downstream. The pointer is associated with a section value for the purpose of the next test: if the current section of the analyzed string has this value, the analysis continues on the isolated cell designated by the pointer; otherwise, the analysis terminates while indicating that the analyzed string does not correspond to a path recorded in the TRIE memory.

Considering FIG. 6, it can be seen that an isolated cell pointed to in linear mode may, where necessary, be stored at an available location of an adjacent register of the same stage, which makes it possible to save a little more memory space.

Figure 7:
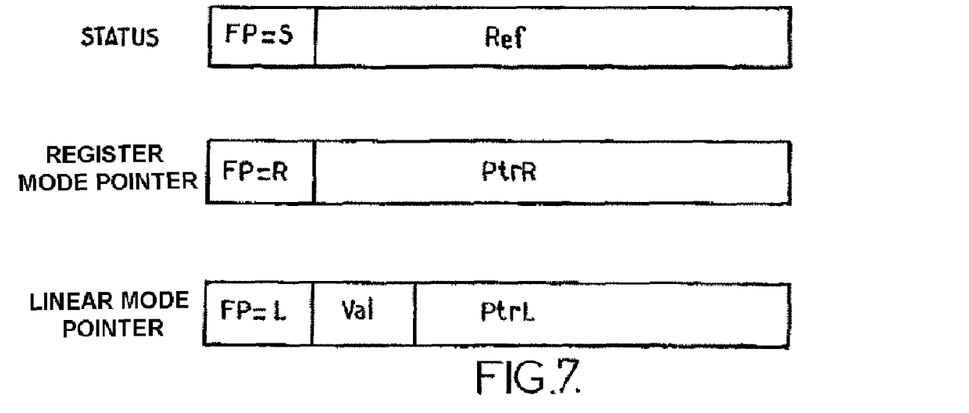
FIG. 7 shows, in three diagrams, an example of content of a memory cell in one embodiment of the invention.

FIG. 7 shows the content of a memory cell in a particular exemplary embodiment. In this example, the first four bits of the cell represent an FP flag whose value indicates in particular the type (status, pointer in register mode or pointer in linear mode) of the data stored in the cell.

In the case of a status (FP=S), the remaining 28 bits of the cell constitute the reference Ref used in the operation of forwarding the packets and/or the commands intended for the programmable controller 16.

If the cell is of the pointer type in register mode, the flag FP=R is followed by a field containing the address PtrR in the memory 14 of the cell of the next stage designated by the pointer. This cell is then the first cell of a register of $2^K$ cells of the next stage.

If the cell is of the pointer type in linear mode, the flag FP=L is followed by a field of K bits containing a test value Val and by a field containing the address PtrL in the memory 14 of the isolated cell of the next stage designated by the pointer.

The flag FP is examined by a cell type detection logic circuit 20 of the analysis unit 13 (FIG. 5). If the cell is of the status type (FP=S), the reference Ref that has been read is delivered by the unit 13 as the result of the analysis of the current string. This status detection also releases the buffer register 15 so that it can receive a subsequent data string to be analyzed.

When the circuit 20 detects that the data received from the memory 14 are of the pointer type (FP=R or L), it supplies the address PtrR or PtrL of the designated cell to an address computation logic element 21 of the analysis unit 13. It also delivers a bit L/R which indicates whether the pointer is in register mode or linear mode.

In register mode, the address computation logic element 21 proceeds to concatenate the pointer PtrR and the value $V_i$ of the next section to be analyzed to generate the address AD at which the next cell in the memory 14 will be read.

In linear mode, the detection circuit 20 also extracts the test value Val from this previously read cell and sends it to a comparison logic element 22. The latter compares the value Val with the next section to be analyzed $V_i$, and delivers a bit v indicating whether these two section values coincide (for example v=0 if $V_i$=VAL and v=1 otherwise). When $V_i$=Val, the address computation logic element 21 supplies to the address bus AD of the memory 14 an address corresponding to the pointer PtrL received from the detection circuit 20 so that the isolated cell designated by the pointer is read in relation with the section $V_i$. If $V_i \neq$ Val, the analysis terminates by indicating that the analyzed string does not correspond to any path recorded in the TRIE memory.

In the foregoing description, the unoccupied cells of the TRIE tree (or the eliminated cells in linear mode) give rise, when they are encountered during the analysis, to an error indication interpreted as the absence of a recorded pattern corresponding to the analyzed string.

Alternatively, these cells are associated with a default reference that the detection circuit 20 returns when such a cell is encountered. The default reference may, in certain applications, be the same for the whole TRIE tree. In this case, it is not necessary to store it in the nodes of the tree, so the data structure schematized by FIG. 6 can be used.

However, it is advantageous that this default reference can vary according to the mother-cell whose pointer designates such a default reference. Advantageously this makes it possible to integrate into the analysis the requirements associated with the "longest match".

Figure 8:
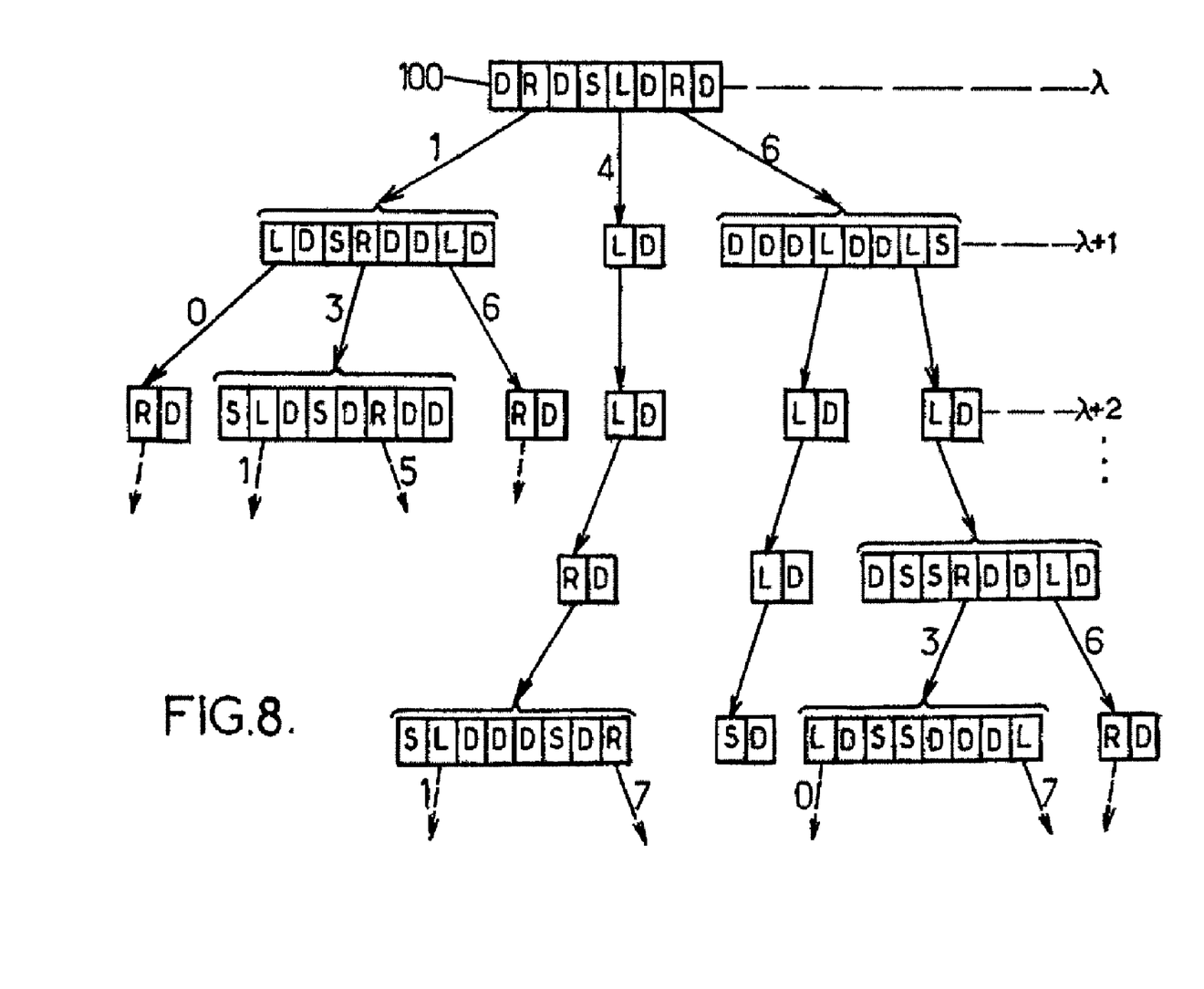
FIG. 8 is a tree representation of a TRIE memory organized according to another embodiment of the invention.

In the latter case, the memory 14 may, in particular, receive a data structure such as that illustrated by FIG. 8. The TRIE tree shown in this FIG. 8 contains the same paths as that of FIG. 6. Each unoccupied cell in FIG. 6 is now occupied by a default reference, which is symbolized by the letter D in FIG. 8.

In a given register, the cells marked D contain the same default reference, which depends on the mother-cell pointing toward this register.

In linear mode, the cells are no longer isolated, but grouped in pairs. The first cell of the pair has the same content as the isolated cell according to FIG. 6, while the other cell contains a default reference, returned when $V_i \neq$ Val when the upstream node is analyzed. The two cells of such a pair have consecutive addresses. Consequently, the analysis can be carried out with the aid of the circuit of the figure: it is sufficient that the address computation logic element 21 supplements the pointer PtrL in linear mode by concatenating thereto the bit v delivered by the comparator 22 to produce the address of the next cell to be read in linear mode.

Figure 9:
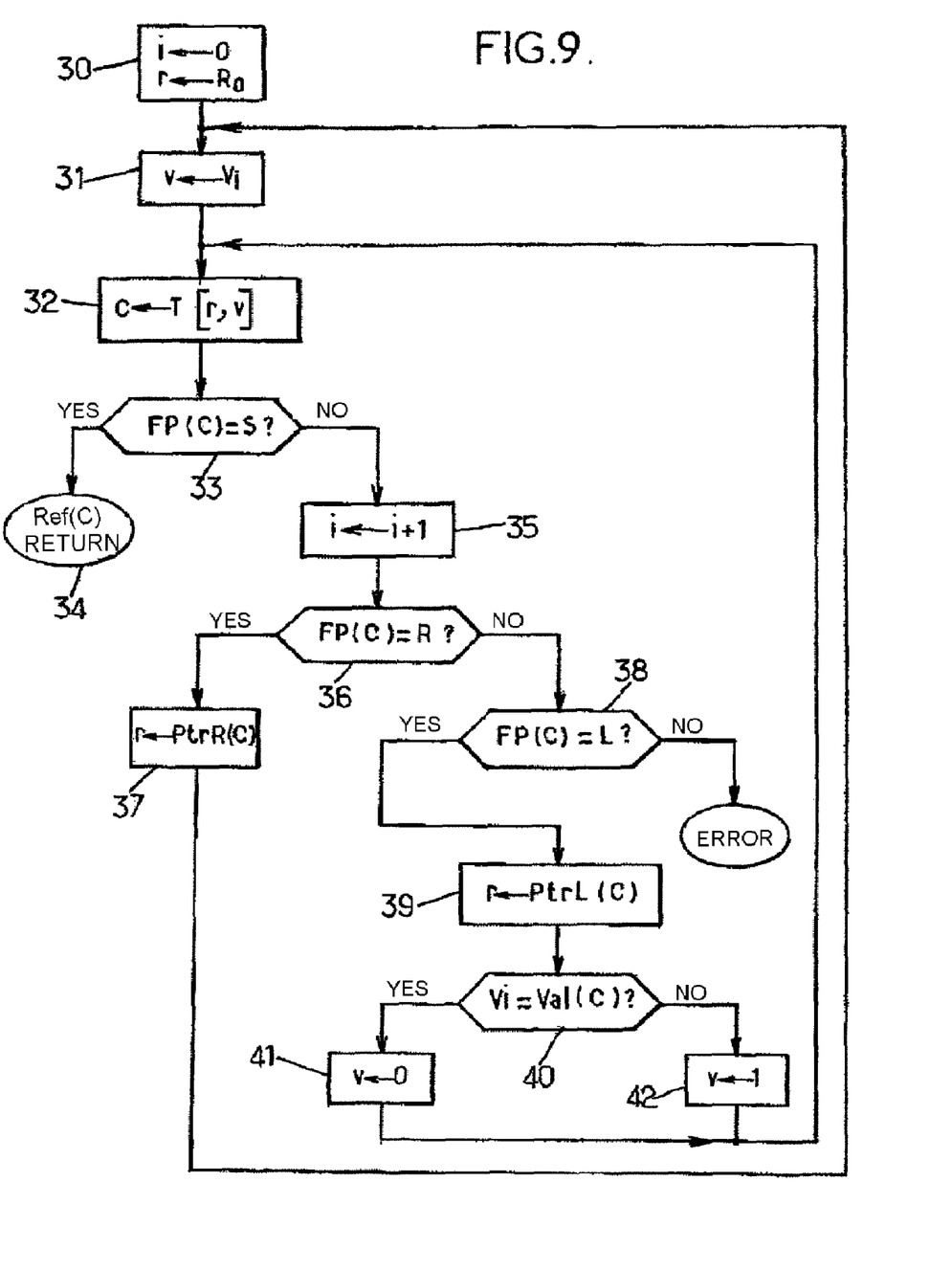
FIG. 9 is a flowchart illustrating a software-based embodiment of a device functionally similar to that of FIG. 5.

A software-based implementation of the latter embodiment of the invention is illustrated by FIG. 9. The flowchart illustrates the operation of the circuit of FIG. 5, and can be used to make an emulator thereof. The preferred embodiments of the invention are hardware-based, but it is also possible to envisage, for applications that are not too fast, making use of software.

On initialization 30 of the algorithm, the analysis rank I is set to 0 and the portal register $R_0$ is selected as the register r. In step 31, the variable v of K bits receives the value $V_i$ of the current section. In each iteration of rank I, the content C of the cell T[r,v], whose address is given by the concatenation of the binary representations of r and v, is read in step 32. If this cell is of the status type (FP(C)=S in test 33), the reference Ref(C) is returned as the result of the analysis in step 34. Otherwise, the analysis must continue and the analysis order I is incremented by one unit in step 35. If the previously read cell was in register mode (FP(C)=R in test 36), the content of the field PtrR of this cell is assigned to the variable r in step 37, and the algorithm returns to the aforementioned step 31. Otherwise, the algorithm, in step 38, examines whether the preceding cell C was in linear mode. If it was (FP(C)=L), the content of the field PtrL of this cell is assigned to the variable r in step 39, and the next section $V_i$ is compared with the test value Val(C) contained in the cell in test 40. If $V_i$=Val(C), the bit v is set to 0 in step 41. Otherwise, it is set to 1 in step 42. After step 41 or 42, the algorithm returns to the aforementioned step 32. Its execution ends when a status is encountered (34), or on an error (43) if a cell type cannot be decoded (FP(C)≠L in test 38).

The TRIE memory data compression and storage method that has just been described makes it possible to analyze data strings in pipeline mode in order to increase the speed of data analysis, the memory 14 being divided into N distinct memory zones from levels 0 to N−1, as indicated hereinabove.

What is claimed is:

1. A TRIE memory device, comprising:
   means for storing bit patterns associated with respective references, and
   means for analyzing data strings by successive sections of K bits to extract one of the references when an analyzed data string matches a stored bit pattern associated with said reference, K being an integer greater than 1,
   wherein the storage means comprise a plurality of successive stages each including a plurality of memory cells,
   wherein each nonempty memory cell of a stage i, with i being an integer at least equal to 0, contains a cell type indicator and data including:
   a pointer designating another memory cell when the cell type indicator is in a first or a second state, the pointer being accompanied by a test value on K bits when the cell type indicator is in the second state;
   a reference associated with a stored bit pattern when the cell type indicator is in a third state,
   and wherein the analysis means comprise:
   means of reading a cell of a stage i, with i being an integer at least equal to 0, in relation with the analysis of the (i+1)th section of a data string;
   means of selecting a cell of stage i+1, to be read in relation with the analysis of a (i+2)th section of the data string, in response to the first state of the indicator in said cell of stage i, the selected cell being located relative to the designated cell by the pointer contained in said cell of stage i according to the value of the (i+1)th section of the data string;
   means of selecting the cell designated by the pointer contained in said cell of stage i, to be read in relation with the analysis of a (i+2)th section of the data string, in response to the second state of the indicator in said cell of stage i when the value of the (i+1)th section of the data string coincides with the test value contained in said cell of stage i; and
   means of extracting the reference contained in said cell of stage i in response to the third state of the indicator in said cell of stage i.

2. The device as claimed in claim 1, wherein the analysis means comprise means for returning a default reference in response to the second state of the indicator in said cell of stage i when the value of the (i+1)th section of the data string differs from the test value contained in said cell of stage i.

3. The device as claimed in claim 2, wherein the default reference depends on the cell of stage i read in relation with the analysis of the (i+1)th section of the data string.

4. The device as claimed in claim 3, wherein the means for returning the default reference are arranged for reading said default reference in a cell located in a determined position relative to the cell designated by the pointer contained in said cell of stage i.

5. The device as claimed in claim 1, wherein each memory cell designated by a pointer contained in a memory cell of stage i whose cell type indicator is in the first state is the first cell of a register of $2^K$ cells addressed on the basis of the value of the (i+1)th section of the data string.

6. The device as claimed in claim 1, wherein each memory cell designated by a pointer contained in the memory cell of stage i whose cell type indicator is in the second state is a cell of a reduced register of two cells addressed on the basis of a bit obtained by comparing the value of the (i+1)th section of the data string with the test value contained in said cell of stage i.

7. The device as claimed in claim 1, wherein the storage means are distributed in N distinct memory zones of levels 0 to N−1, N being an integer less than a maximum number of stages of the storage means and the analysis means are organized as a pipeline in relation with the N memory zones.

* * * * *